United States Patent
Naidu

(10) Patent No.: US 10,200,337 B2
(45) Date of Patent: *Feb. 5, 2019

(54) COMBINING UPDATES OF A SOCIAL NETWORK FEED

(71) Applicant: salesforce.com, inc., San Francisco, CA (US)

(72) Inventor: Kaushick Naidu, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,025

(22) Filed: Jul. 24, 2018

(65) Prior Publication Data

US 2018/0331995 A1    Nov. 15, 2018

Related U.S. Application Data

(63) Continuation of application No. 15/131,899, filed on Apr. 18, 2016, now Pat. No. 10,057,206.

(51) Int. Cl.
  *H04L 12/58* (2006.01)
  *G06Q 50/00* (2012.01)

(52) U.S. Cl.
  CPC .............. *H04L 51/32* (2013.01); *H04L 51/16* (2013.01); *G06Q 50/01* (2013.01)

(58) Field of Classification Search
  CPC .......... G06Q 50/01; H04L 51/16; H04L 51/32
  USPC ........................................................ 709/206
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

U.S. Office Action dated Oct. 21, 2015 issued in U.S. Appl. No. 14/297,207.

(Continued)

*Primary Examiner* — Michael C Lai
(74) *Attorney, Agent, or Firm* — Weaver Austin Villeneuve & Sampson LLP

(57) ABSTRACT

Disclosed are examples of systems, apparatus, methods and computer program products for combining updates of a social network feed. In some implementations, a feed of a social networking system can be configured to share feed items associated with an enterprise record. The feed items can include a first update associated with a first user. A first request to share a comment on the first update can be processed. A second request to share a first post in a feed can be processed. The first post can be related to the first update based on a first attribute conforming to a second attribute. A combined update can be generated based on the first post being related to the first update. The combined update can be displayed in a feed.

20 Claims, 8 Drawing Sheets

(56) References Cited

U.S. PATENT DOCUMENTS

| | | | |
|---|---|---|---|
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,843,454 B1 | 11/2010 | Biswas |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,843,491 B1 | 9/2014 | Mazniker et al. |
| 8,856,141 B1 | 10/2014 | Dean et al. |
| 8,930,819 B1 * | 1/2015 | Chan et al. .............. H04L 67/10 715/736 |
| 9,020,957 B1 * | 4/2015 | Schneider .............. G06Q 50/01 707/749 |
| 9,208,187 B2 * | 12/2015 | Dunn ...................... G06Q 50/01 |
| 9,361,368 B1 * | 6/2016 | Patel .................. G06F 17/30705 |
| 9,443,224 B2 * | 9/2016 | Dunn ...................... G06Q 10/10 |
| 10,057,206 B2 | 8/2018 | Naidu |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0177562 A1* | 8/2005 | Raciborski ........ G06F 17/30967 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0095509 A1 | 4/2014 | Patton |
| 2014/0172962 A1 | 6/2014 | Zhu et al. |
| 2014/0310268 A1 | 10/2014 | Rosenstock et al. |
| 2014/0317142 A1* | 10/2014 | Naidu ............... G06F 17/30542 707/780 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0154269 A1 | 6/2015 | Miller et al. |
| 2015/0172563 A1 | 6/2015 | Jakobson et al. |
| 2015/0188875 A1 | 7/2015 | Sharp et al. |
| 2015/0358303 A1 | 12/2015 | Hui et al. |
| 2017/0302610 A1 | 10/2017 | Naidu |

OTHER PUBLICATIONS

U.S. Final Office Action dated Mar. 21, 2016 issued in U.S. Appl. No. 14/297,207.
U.S. Office Action dated Jan. 19, 2017 issued in U.S. Appl. No. 14/297,207.
U.S. Final Office Action dated Jul. 10, 2017 issued in U.S. Appl. No. 14/297,207.
U.S. Office Action dated Jan. 2, 2018 issued in U.S. Appl. No. 15/131,899.
U.S. Notice of Allowance dated May 21, 2018 issued in U.S. Appl. No. 15/131,899.
"Google Plus Users", Google+Ripples, Oct. 31, 2011 [retrieved on Feb. 21, 2012 from Internet at http://www.googleplusers.com/google-ripples.html], 3 pages.

* cited by examiner

COMBINING UPDATES OF A SOCIAL NETWORK FEED

PRIORITY DATA

This patent document is a continuation of and claims priority to co-pending and commonly assigned U.S. patent application Ser. No. 15/131,899, titled "Combining Updates of a Social Network Feed," by Kaushick Naidu, filed Apr. 18, 2016, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to social network feeds. More specifically, this patent document discloses techniques for combining updates of a social network feed.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer techniques for combining updates of a social network feed. These drawings in no way limit any changes in form and detail that may be made by one skilled in the art without departing from the spirit and scope of the disclosed implementations.

DETAILED DESCRIPTION

Figure 1:
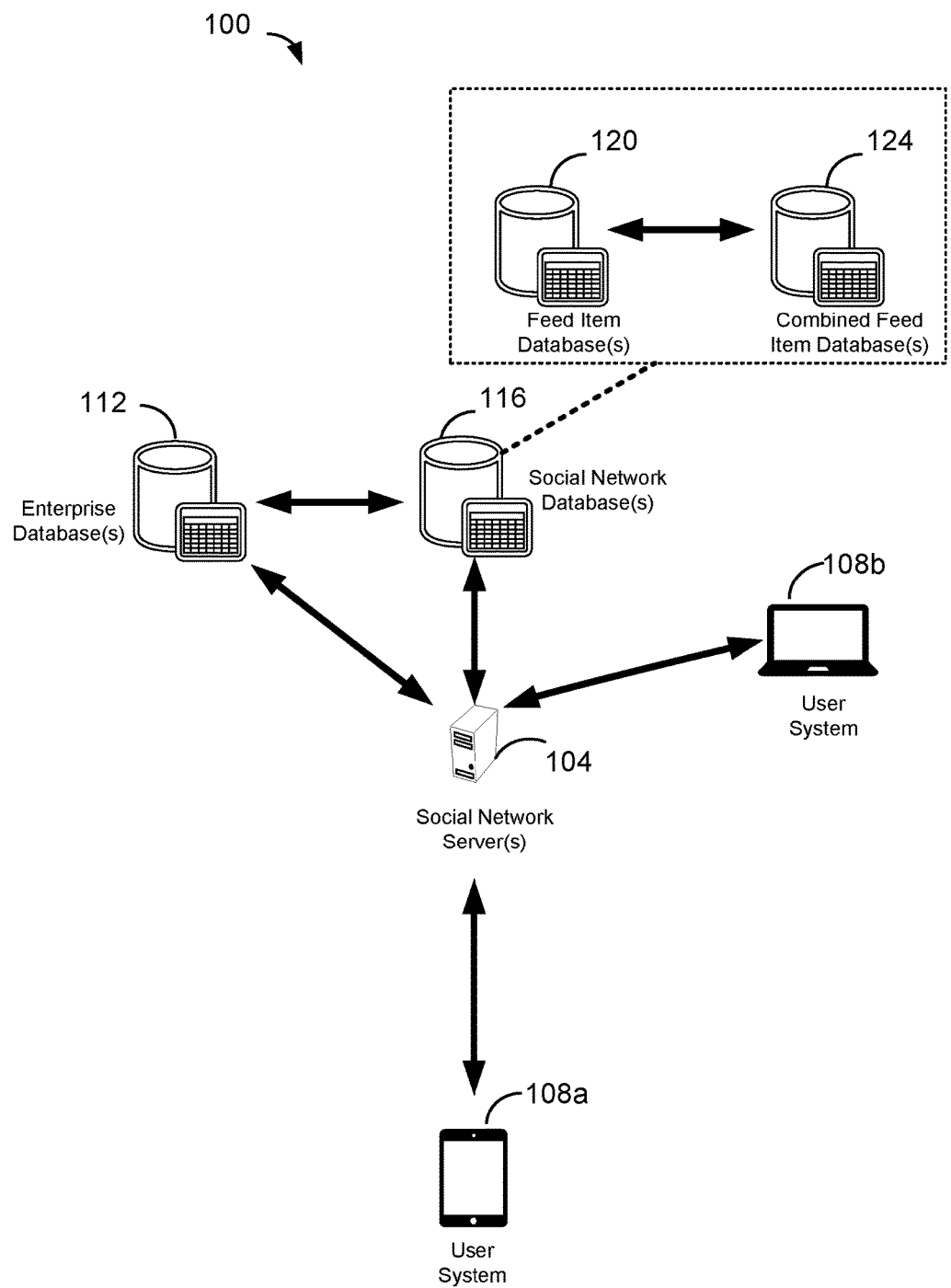
FIG. 1 shows a system diagram of an example of a system 100 for combining updates of a social network feed, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for combining updates of a social network feed.

In some conventional social network environments, users are presented with a social network feed in the form of a chronological vertical scroll, which is regularly updated to display new feed items at the top of the scroll. A new feed item added to the feed generally includes an update with content reporting recent activity occurring within the social network environment. A user may read, comment on, and otherwise interact with feed items many times in a day. As such, feed items in a social network feed provide digital spaces where online conversations between multiple users of the social network occur. Often, a new or recently added feed item includes repeated and redundant portions of conversations previously shared in earlier feed items. This can lead to users wasting time and energy having to filter through the redundant content and sometimes end up thinking of and typing thoughts, which have already been discussed in previous feed items of a conversation.

By way of illustration, Juan is an engineer at Slow Thoughts, a software company that specializes in cloud-based meditation and wellness software. Slow Thoughts has thousands of employees at various locations around the world. Juan, located in the United States, is part of a global team of engineers responsible for developing a new smartphone app offering guided meditations. The team has been hard at work for the past few months. Ben, the project manager, has urgent questions about the product. Ben writes a post with three questions that he shares on a Slow Thought's enterprise social networking system. Juan receives a notification of Ben's post, and a feed item with Ben's post is presented in Juan's social network feed.

As Juan is reading the questions, Juan realizes that he answered the same questions for another team member some time ago, although Juan cannot remember how many weeks or months ago. Juan tries scrolling through past entries to look for the old feed item with the answers. However, because hundreds of feed items are published to his feed each day, he becomes frustrated scrolling through thousands of past feed items. Not only does it take a long time to find the old feed item of interest, but after finding the item, Juan spends additional time copying, pasting, and reformatting a thread of 10 comments in the old feed item into a new comment to submit in response to Ben's post. Consequently, Juan wastes valuable time and energy that otherwise might have been used to solve other problems associated with completing and delivering the smartphone app.

By contrast, some of the disclosed techniques can be implemented for combining updates of a social network feed. In an alternative scenario to the scenario described above, when Juan realizes he has previously answered the questions, he may employ some implementations of some of the disclosed techniques to promptly merge the old feed item containing the 10 comments with Ben's post. For example, Juan can type "@merge Prior Feed Item" into the comment field of Ben's post to integrate the comments with responses to Ben's questions. In another example, as Juan types keywords related to the old feed item into the comment field, a pop-up window is displayed next to the comment field of Ben's post. The pop-up window includes suggested feed items to merge with Ben's post, where the suggested feed items contain or are tagged with the keywords. After selecting "Prior Feed Item" from the pop-up window, the comment field of Ben's post is populated with "@merge Prior Feed Item." Juan selects a "submit" button to finalize merging the old feed item(s) with Ben's post. As a result, Juan does not have to scroll through hundreds of past feed items. Furthermore, Ben receives a quicker response, and Juan spends less time answering Ben's questions. Consequently, both individuals use their saved time to resolve other problems and deliver the smartphone app sooner.

Some but not all of the techniques described or referenced herein are implemented using a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include updates presented as items or entries in the feed. Such a feed item can include a single update or a collection of individual updates. A feed item can include various types of data including character-based data, audio data, image data and/or video data. A social network feed can be displayed in a GUI on a display device such as the display of a computing device as described below. The updates can include various social network data from various sources and can be stored in an on-demand database service environment. In some implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Updates can include various types of updates, which may or may not be linked with a particular record. For example, updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other updates, such as words, phrases, statements, answers, questions, and reactionary emotional expressions and/or symbols. Multimedia data can be included in, linked with, or attached to a post or comment.

For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of update that can be received and included in the user's news feed. Any number of users can follow a particular entity and thus view updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes updates and other feed items that are about the group as a whole, the group's purpose, the group's description, and group records and other objects stored in association with the group. Threads of updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

FIG. 1 shows a system diagram of an example of a system 100 for combining updates of a social network feed, in accordance with some implementations. System 100 includes a variety of different hardware and/or software components, which are in communication with each other. In FIG. 1, system 100 includes at least one social network server 104, at least one enterprise database 112, and at least one social network database 116 that may further include at least one feed item database 120 and at least one combined feed item database 124. In some implementations, database tables are provided in the databases to organize and maintain feed items. Also or alternatively, data objects can be arranged in various manners to store and/or identify feed items, which may be represented by specific instances of data objects. A user system 108a and a user system 108b may be operated by different users or the same user to communicate with system 100 through social network server 104.

Social network server 104 may communicate with other components of system 100 and with components of other systems disclosed herein. This communication may be facilitated through a combination of networks and interfaces. Social network server 104 can include one or many servers, and in alternative implementations can include some or all of enterprise database 112 and social network database 116. Social network server 104 may handle and process interactions with the various components of system 100 from user systems 108a and 108b. In addition, data sent to social network server 104 can include information identifying a user of user system 108a, a feed item with which the user is interacting, and a type of interaction the user is having with the feed item. Likewise, social network server 104 may return responses based on these interactions to user systems 108a and 108b. Also or alternatively, social network server 104 may automatically retrieve data from any database of system 100, and send that data to user systems 108a and 108b. For example, social network server 104 may populate a social network feed with feed items in a user interface displayed to a user of user system 108a. In other implementations, social network server 104 may retrieve data from one or more databases, combine some or all of the data from different databases, and send processed data including a combined update from two or more feed items to user system 108a or 108b.

Enterprise database 112 can be configured to receive, transmit, store, update, and otherwise maintain organized collections of information related to organizations subscribing to system 100. In some implementations, enterprise database 112 can store CRM records specific to one organization in an enterprise system such as system 100. Examples of CRM records include accounts, opportunities, leads, cases, contacts, contracts, campaigns, solutions, quotes, purchase orders, etc. In some implementations, CRM records are hierarchically arranged in enterprise database 112 with some CRM records identifying relationships between and among records stored in social network database 116, feed item database 120, and combined feed item database 124.

Social network database 116 can be configured to cooperate with social network server 104 to implement and manage a social networking system including social network feeds, feed items, combined updates and associated metadata all stored or identified by social network data in social network database 116. Also or alternatively, social network database 116 can store data identifying feed items, record updates, or posts related to a record stored in enterprise database 112. Additionally, social network database 116 can store user profiles, permission sets, and other metadata or data objects identifying particular feeds. In some implementations, a feed item is arranged hierarchically through threads of comments contributed by many different users. For example, a feed item related to an update about "Widget A" may include five comments from five different members of an engineering team.

User systems 108a and 108b may be computing devices capable of communicating via one or more data networks with a server. Examples of user systems 108a and 108b include a desktop computer or portable electronic device such as a smartphone, a tablet, a laptop, a wearable device such as Google Glass®, another optical head-mounted display (OHMD) device, a smart watch, etc. Also or alternatively, there may be user profiles specific to the users of user systems 108a and 108b. In some implementations, social network server 104 can generate a feed including feed items and combined updates. In addition, social network server 104 can cause feed items and/or the combined updates to be displayed at both user systems 108a and 108b. Also or alternatively, user systems 108a and 108b can receive user input to process a request to comment on a feed item or process a request to share a post. Additionally, user systems 108a and 108b may be different types of computing devices. For example, user system 108a may be a desktop computer whereas user system 108b may be a smartphone.

Figure 2:
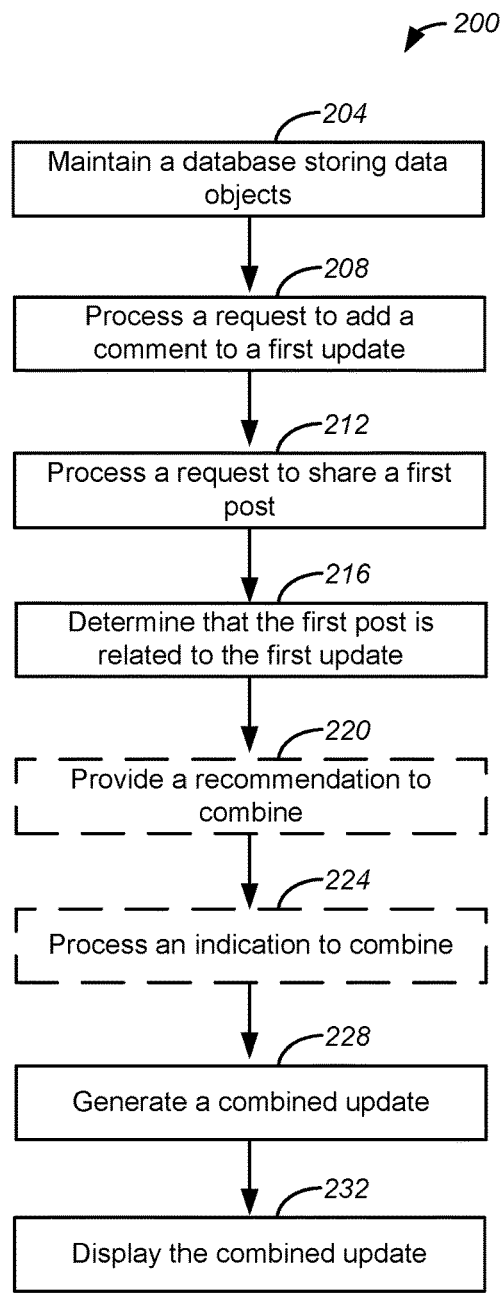
FIG. 2 shows a flow chart of an example of a method 200 for combining updates of a social network feed, in accordance with some implementations.

FIG. 2 shows a flow chart of an example of a method 200 for combining updates of a social network feed, in accordance with some implementations. Method 200 and other methods described herein may be implemented using the system 100 of FIG. 1, although the implementations of such methods are not limited to system 100. For example, method 200 of FIG. 2 may be implemented using some components and elements of systems described below with reference to FIGS. 6A-7B.

In block 204 of FIG. 2, a database storing enterprise records and a database storing feed items is maintained as part of a database system, for instance, as explained above with reference to FIG. 1. As described above, social network server 104 can be configured to maintain and update feeds that include feed items related to a particular user, group, or organization.

In block 208 of FIG. 2, a request is processed by social network server 104 of FIG. 1 to add a comment to a first update, such as a record update or a post shared on a feed. For example, the first update may have been a user-submitted post describing or referencing a particular enterprise record, such as a CRM record stored in enterprise database 112 of FIG. 1. In some implementations, the CRM record is of a particular type such as a lead, opportunity, account, etc. In some implementations, the first update may be a record update automatically generated by social network server 104. For example, if a user creates a new opportunity in enterprise database 112, then social network server 104 may automatically generate a record update reporting the creation or updating of the new opportunity.

Figure 3:
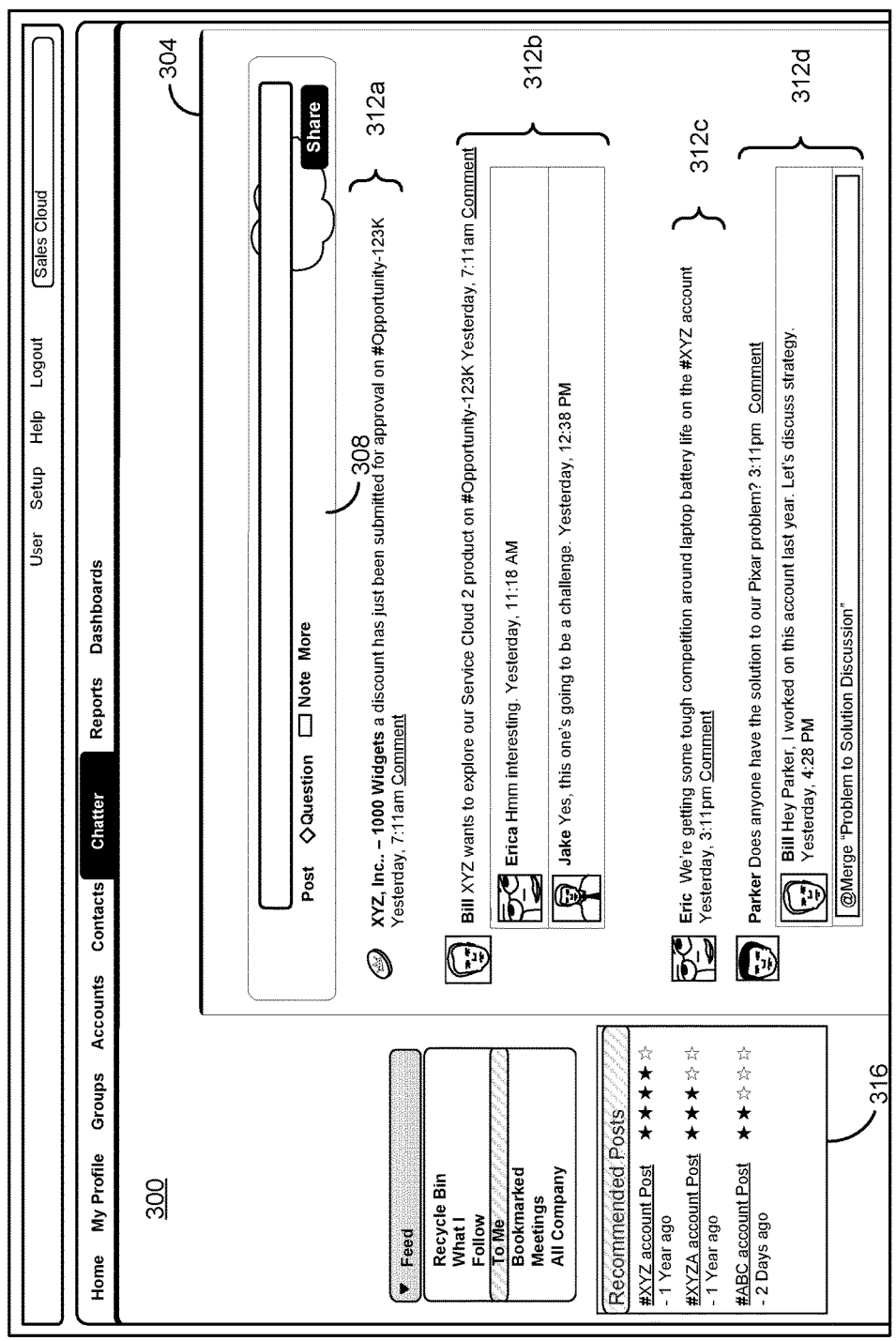
FIG. 3 shows an example of a user interface 300 with a social network feed in the form of a graphical user interface (GUI) as displayed on a computing device, in accordance with some implementations.

FIG. 3 shows an example of a user interface 300 with a social network feed in the form of a graphical user interface (GUI) as displayed on a computing device, in accordance with some implementations. In FIG. 3, user interface 300 includes a publisher 308 and feed items 312a, 312b, 312c, and 312d displayed in social network feed 304. As shown in FIG. 3, feed item 312a is an example of a record update, and feed item 312c is an example of a post. In one example, Bill, a user of user system 108a of FIG. 1 is viewing user interface 300 of FIG. 3. Bill sees feed item 312d in social network feed 304. Realizing he may be of help to Parker, Bill may select a "Comment" hyperlink and write a comment to Parker saying, "I worked on this account last year. Let's discuss strategy." Selecting a "Comment" hyperlink may cause the display to refresh and display a text field box. Also or alternatively, selecting a "Comment" hyperlink can cause a text cursor to be placed in publisher 308. As such, a user can quickly respond to a feed item without navigating away from the page.

In block 212 of FIG. 2, a request is processed by social network server 104 of FIG. 1 to share a first post. The first post is separate and distinct from the first update and the comment discussed in block 208 of FIG. 2. Returning to the example in FIG. 3, six months ago, Parker published his post in feed item 312d asking, "Does anyone have the solution to our Pixar problem?" Seth, a user of user system 108b of FIG. 1, may share a contemporary post or comment with an identical question. In other words, Seth may use publisher 308 of FIG. 3 to compose a question, "Does anyone have the solution to our Pixar problem?" As such, some or all of the content of Seth's post may be identical to Parker's earlier post, although the posts have different unique identifiers for storage and identification in feed item database 120 of FIG. 1.

In block 216 of FIG. 2, it is determined that a first post, such as Seth's question described above, is related to an earlier update, such as Parker's earlier post. In some implementations, the determination is based in part on processing a notification or indication as discussed further below in block 224. In other implementations, the determination is based on an attribute of user-submitted content of the first post conforming to one or more attributes of the earlier update. For example, a system administrator operating user system 108a of FIG. 1 may determine that Seth's question has the same keywords or topics as Parker's earlier question. Also or alternatively, social network server 104 may be configured to automatically determine that content such as one or more keywords, references to the same feed item, or references to documents, files, records, websites, etc. in Seth's post also appear in Parker's earlier post. By the same token, social network server 104 may be configured to automatically compare and identify any similarities between data attached to posts, such as topics, tags, documents, files, etc. to determine whether the posts are related. Also or alternatively, social network server 104 can make determinations continuously or at specified intervals.

In another example of block 216 of FIG. 2, Seth's post and Parker's earlier post both contain content identifying the same particular stage of a sales process for Account ABC. For example, an account development representative may process and reach out to potential leads. After working with a lead, the account development representative may deem the lead promising enough to promote to an opportunity. At this stage, the account development representative may work with a supervisor, an account executive, in handling the opportunity. Finally, the account executive may pitch a proposal and close the sale. Throughout this process, data objects such as CRM records representing stages of this sale process can be created and updated accordingly to track the progress of the sale to ABC, Inc. For example, there may be a lead record and opportunity record representing different stages of the sales process.

In block 220 of FIG. 2, when it is determined that a later post is related to an earlier update, such as Seth's post and Parker's post in the example above, a recommendation to combine the post and update may be generated by social network server 104 of FIG. 1. In some other implementations, the recommendation is generated at a user system based on data identifying the relatedness provided by social network server 104. In some implementations, such a recommendation is graphically presented in a user interface on a display of a user system to identify a possible similarity and to suggest combining the post and update. In some implementations, before a later post is published, but while a user inputs text into a publisher in the user interface, social network server 104 may analyze the text being inputted. According to the text analysis, social network server 104 may suggest earlier updates to combine based on similarities between the inputted text and earlier updates, as described above at block 216 of FIG. 2. Also or alternatively, a recommendation engine on a different server than social network server 104 of FIG. 1 can be implemented to perform the processing of block 220 of FIG. 2.

In some implementations, lexical units of a later post are compared with lexical units of previous updates to determine if the later post and any earlier updates are related, as discussed above with reference to block 216. In some implementations, social network server 104 of FIG. 1 can measure the length of a sentence to derive a total span of a post. A total span may then be parsed into lexical units based on content and part of speech recognition. To illustrate, an earlier feed item may include a post stating, "What is the old price of Product A?" and a comment stating, "The old price of Product A is 50 dollars and the new price of Product A is 40 dollars." In this example, as a user types the words "Product A," "new," or "old" in a comment text field or the publisher, a recommendation to merge the message being composed with the "What is the old price of Product A?" post may be generated and displayed in a user interface. For instance, in FIG. 3, recommendation container 316 identifies three earlier posts as related to the text typed into the comment field of feed item 312*d*. In this example, each of the three recommend posts include a relevancy rating in the form of a number of stars indicating a numerical measure of relevance, a title of the post, and the date the post was shared or last updated.

Figure 4A:
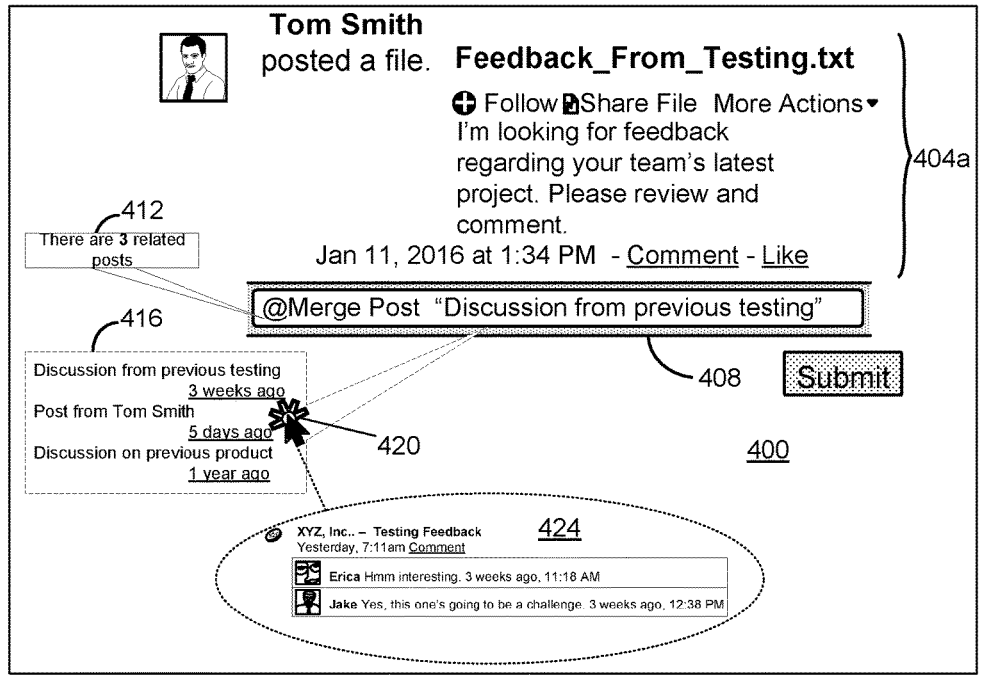
FIGS. 4A-C show examples of feed items of a social network feed, in accordance with some implementations.
Figure 4B:
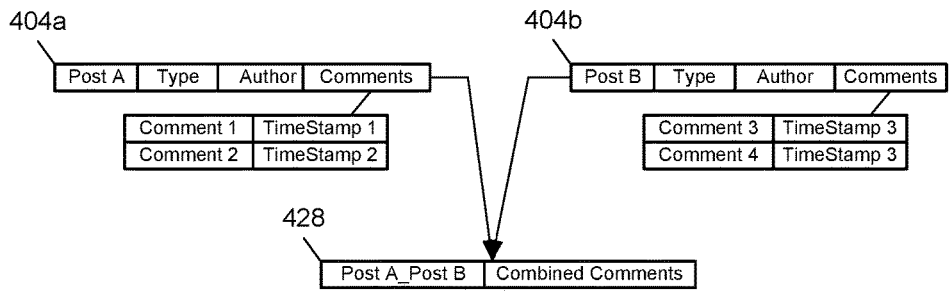
Figure 4C:
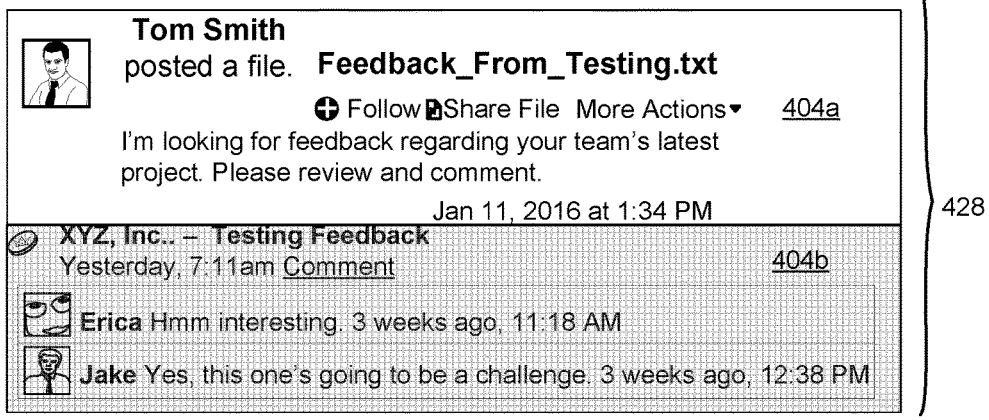

In some other implementations, FIGS. 4A-C show examples of feed items of a social network feed. In FIG. 4A, user interface 400 includes feed item 404*a*. As a user enters text into comment text box 408, recommendation pop-up 412 and expanded recommendation pop-up 416 are generated based on the entered text. Social network server 104 of FIG. 1 may display recommendation pop-up 412 of FIG. 4A and expanded recommendation pop-up 416 as part of user interface 400. In some implementations, a user may select a link within recommendation pop-up 412 that causes expanded recommendation pop-up 416 to be displayed in user interface 400. In the example of FIG. 4A, a user replying to Tom Smith's post wants to combine a previous post with Tom Smith's post. The user has inputted "@Merge Post 'Discussion from previous Testing'" into comment text box 408. In response to a user typing into comment text box 408, expanded recommendation pop-up 416 may be displayed with a list of recommended posts identified using the techniques described above as related to Tom Smith's post or the user's text in comment text box 408. Expanded recommendation pop-up 416 can include highlights of details about the suggested posts. In the example of FIG. 4A, there are three related posts shown in expanded recommendation pop-up 416: "Discussion from previous testing," last updated 3 weeks ago; "Post from Tom Smith," last updated five days ago; and "Discussion on previous product," last updated one year ago. In some implementations, other details may be included in expanded recommendation pop-up 416, for instance, the number of comments, a relevancy score in relation to the post, users who interacted with the post, etc. In addition, a user may use mouse cursor 420 to hover over or select one of the related posts in expanded recommendation pop-up 416 to display preview 424 in user interface 400. In the example of FIG. 4A, mouse cursor 420 is hovering near the related post, "Discussion from previous testing." In some implementations, social network server 104 of FIG. 1 may determine the location of mouse cursor 420 of FIG. 4A. In response to this determination, social network server 104 of FIG. 1 may display preview 424 of FIG. 4A. Preview 424 can include a graphical representation of some or all of the post residing under the location of the mouse. As such, a user can quickly recall if the suggested post is relevant enough to combine with another feed item.

In block 224 of FIG. 2, an indication or notification to combine is processed by social network server 104 of FIG. 1. In some implementations, block 224 of FIG. 2 is performed as part of block 216. In one example, the indication is based on user input identifying two updates to combine, such as an earlier record update and a post the user is currently composing. Another example is an earlier post and a comment the user is currently composing or recently shared on a feed. In some other implementations, an indication to combine can be system-generated to automatically combine updates identified as related. For example, user-generated or system-generated input such as an @mention tag, name, title, timestamp, and/or record identifier can be provided. Returning to FIG. 3, a user composing or sharing the comment of feed item 312*d* may be the basis for an indication to be sent to social network server 104 of FIG. 1. The indication identifies Parker's post in feed item 312*d* of FIG. 3 and identifies the update, "Problem to Solution Discussion." Similarly, in FIG. 4B, identifying information from feed item 404*a* includes an identifier "Post A," a type, an author, and identifiers for the comments. Likewise, feed item 404*b* includes an identifier "Post B," a type, an author, and identifiers for the comments. In some implementations, timestamps of respective updates may further be compared to identify related updates to combine. For instance, timestamps within a designated time window can be identified as related.

Figure 5A:
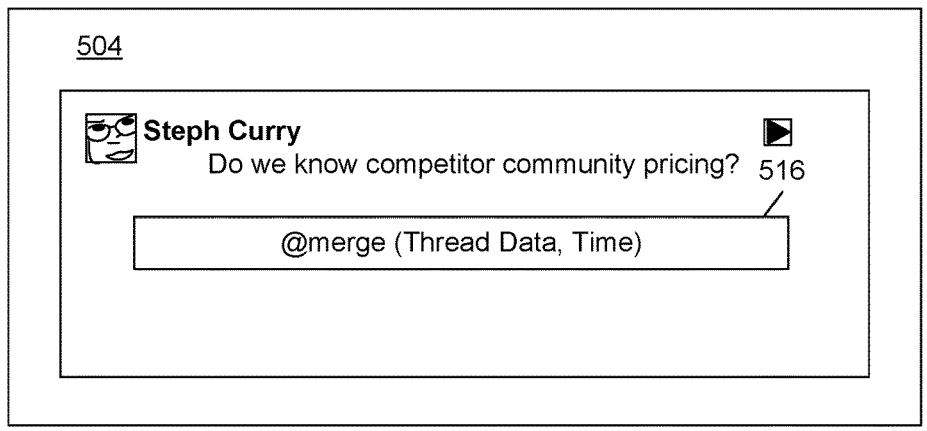
FIGS. 5A-C show examples of presentations for combining updates in the form of GUIs 504, 508 and 512 as displayed on a computing device, in accordance with some implementations.
Figure 5B:
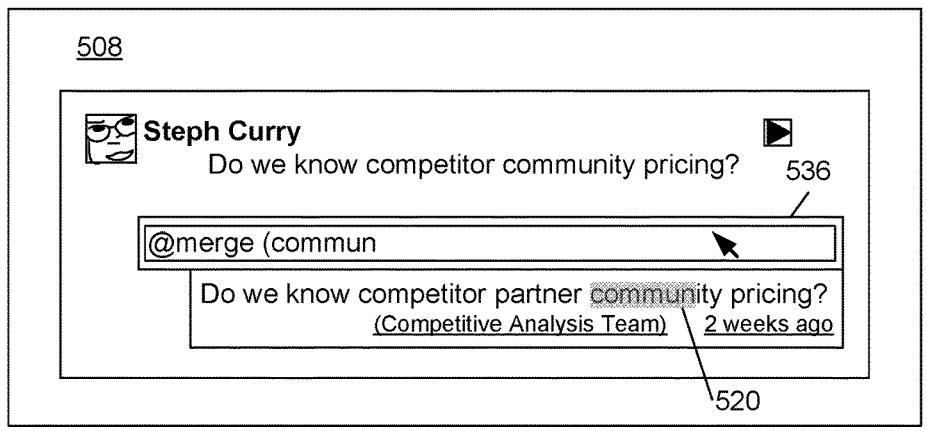
Figure 5C:
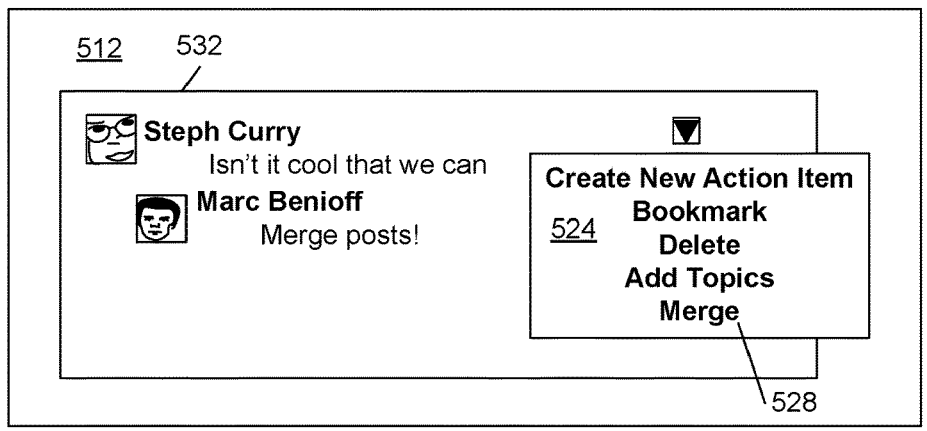

FIGS. 5A-C show examples of presentations for combining updates in the form of GUIs 504, 508 and 512 as displayed on a computing device, in accordance with some implementations. FIG. 5A includes user interface 504 with "@merge (Thread Data, Time)" inputted into comment text box 516. FIG. 5B includes user interface 508 that shows the word "community" partially inputted into comment text box 536. As a user types key phrases regarding a prior post into comment text box 536, highlighted portion 520 of a related post is displayed. Highlighted portion 520 includes a visual overlay such as a contrasting color, which distinguishes key phrases of the related post from other text in the related post. FIG. 5C includes user interface 512 that shows an option to perform different actions in relation to the feed item. In the example of FIG. 5C, a user may choose pulldown menu action 528 from pulldown menu 524 to "Merge" feed item 532 in user interface 512 with a related update or post.

In block 228 of FIG. 2, a combined update is generated by social network server 104 of FIG. 1 and stored in combined feed item database 124. In some alternative implementations, rather than generating and storing a separate combined update, pointers may be used in the database(s) storing the updates to associate the updates with each other. In some implementations, a combined update includes an update, a comment, and an independent post. In FIG. 4B, data from feed item 404*a* and feed item 404*b* is combined and stored in combined update 428. In some implementations, the original post of each of feed item 404*a* and 404*b* can be stored in feed item database 120 of FIG. 1. Additionally, comments of feed item 404*a* and 404*b* can be stored in feed item database 120 of FIG. 1. The comments can be stored hierarchically in feed item database 120 according to timestamps for each comment.

In block 232 of FIG. 2, a combined update is displayed on user system 108*a* of FIG. 1. In some implementations, the displayed update includes a graphical indication that an update, a comment, and a different post have been combined. In some implementations, a combined update may be displayed as a new and distinct feed item in a social network feed. For example, after feed item 312*d* of FIG. 3 has been combined with another post, then a combined update may be displayed above feed item 312*a* in social network feed 304. In other implementations, feed item 312*d* may be removed from display in social network feed 304 upon display of a combined update. In FIG. 4C, combined update 428 shows that feed item 404*a* and feed item 404*b* have been combined. In some implementations, combined update 428 may be graphically presented to distinguish the two feed items that were combined. In this example, feed item 404*a* is one color, and feed item 404*b* is a different color. In other implementations, combined update 428 may have a combination of visual indicators that may assist a user in distinguishing between the two feed items.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 6A:
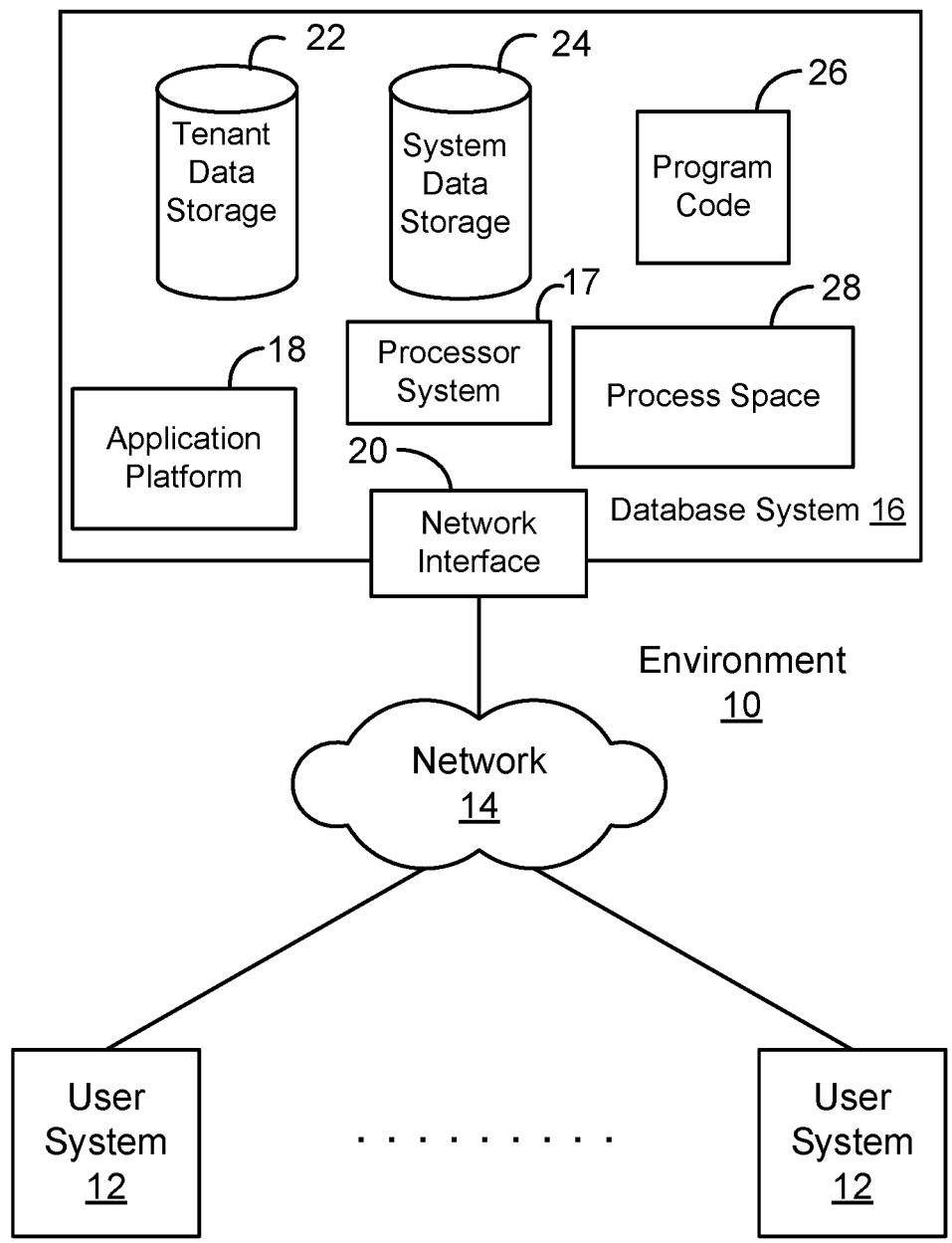
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 6B:
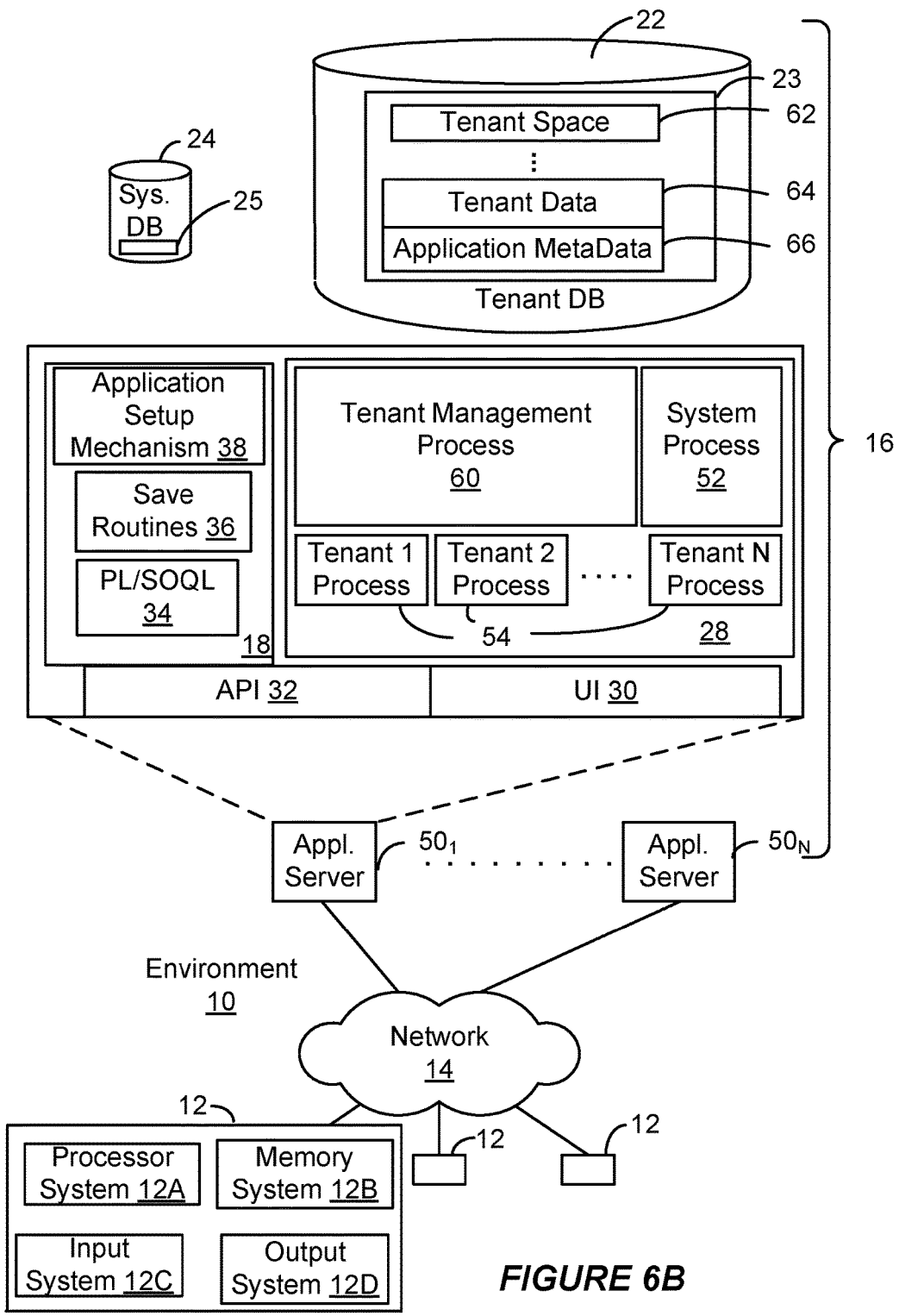
FIG. 6B shows a block diagram of an example of some implementations of elements of FIG. 6A and various possible interconnections between these elements.

One arrangement for elements of system 16 is shown in FIGS. 6A and 6B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system"

and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
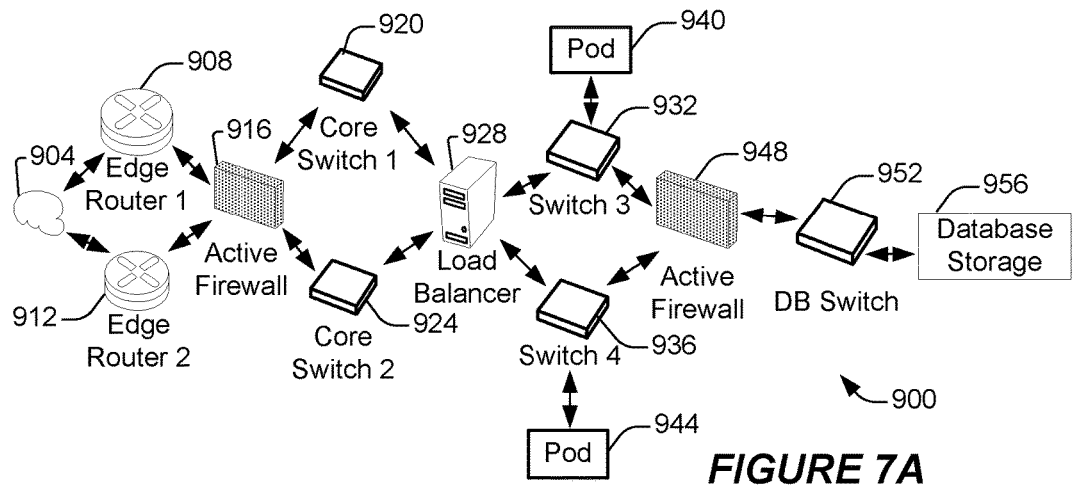
FIG. 7A shows a system diagram of an example of architectural components of an on-demand database service environment 900, in accordance with some implementations.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 7B:
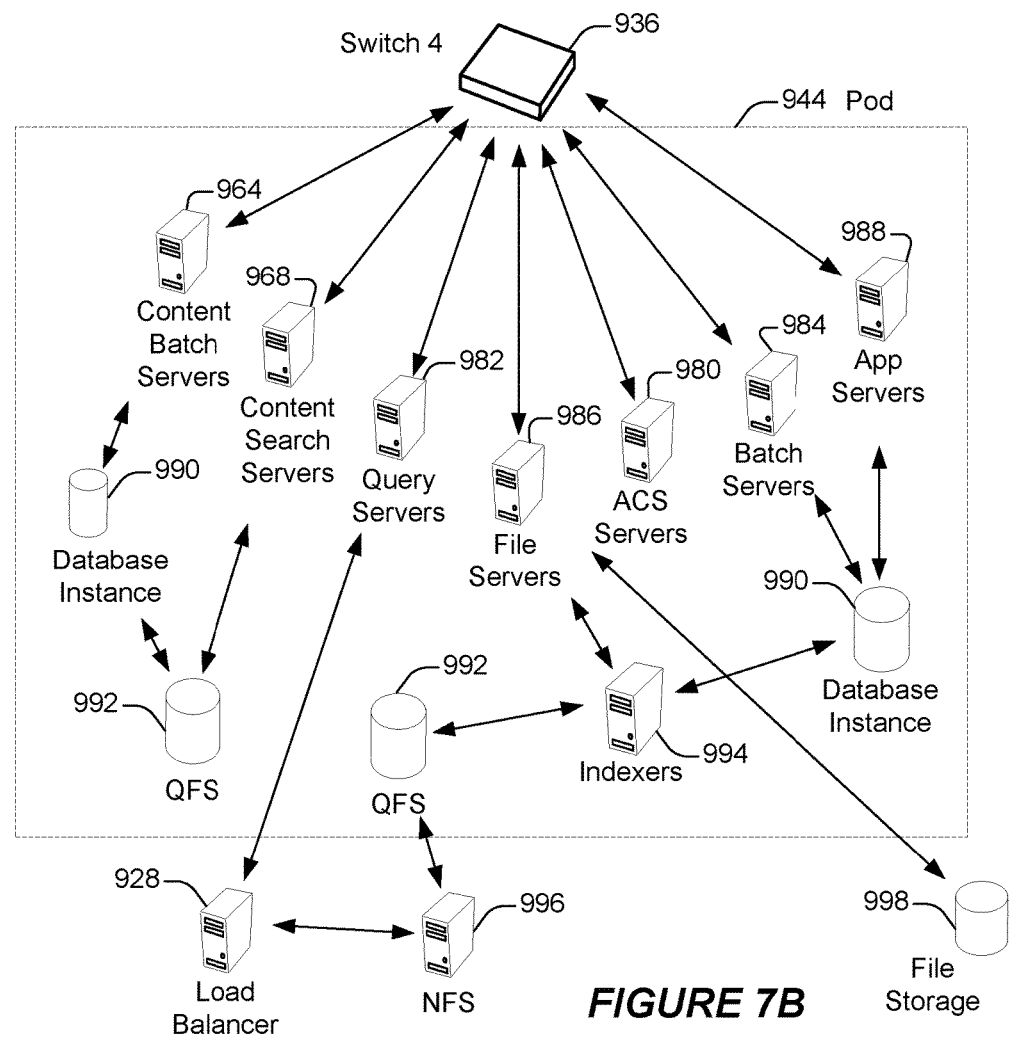
FIG. 7B shows a system diagram further illustrating an example of architectural components of an on-demand database service environment, in accordance with some implementations.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system comprising at least one processor, the database system associated with a social networking system, the database system configured to cause:
   obtaining a first request to share a comment on a first update in a feed of the social networking system;
   obtaining a second request to share a second update in a feed of the social networking system, the second update being independent of the first update and independent of the comment;
   determining, using one or more data objects stored in a database, or processing a notification, using the one or more data objects, that the second update is related to the first update based at least in part on at least one first attribute of the first update conforming to at least one second attribute of the second update;
   defining, based on the second update being related to the first update, a combined update comprising at least: the first update, the comment, and the second update; and
   displaying the combined update on a user device, the displayed update comprising a graphical indication that the first update, the comment, and the second update have been combined.

2. The system of claim 1, wherein the first attribute is related to user-submitted content of the first post, and the user-submitted content comprises social media message content related to a stage of a sales process, the stage of the sales process identified by the at least one first attribute and the at least one second attribute.

3. The system of claim 1, the database system further configured to cause:
   displaying a recommendation of a third update to combine with the combined update.

4. The system of claim 1, wherein the at least one first attribute and the at least one second attribute identify a first type of customer relationship management (CRM) record.

5. The system of claim 4, wherein the displayed update identifies the first type of CRM record.

6. The system of claim 1, wherein the first request is based on user input related to a first enterprise record.

7. The system of claim 6, wherein the comment identifies the first enterprise record.

8. A method comprising:
   obtaining a first request to share a comment on a first update in a feed of a social networking system associated with a database system;
   obtaining a second request to share a second update in a feed of the social networking system, the second update being independent of the first update and independent of the comment;
   determining, using one or more data objects stored in a database, or processing a notification, using the one or more data objects, that the second update is related to the first update based at least in part on at least one first attribute of the first update conforming to at least one second attribute of the second update;

defining, based on the second update being related to the first update, a combined update comprising at least: the first update, the comment, and the second update; and causing display of the combined update on a user device, the displayed update comprising a graphical indication that the first update, the comment, and the second update have been combined.

9. The method of claim 8, wherein the first attribute is related to user-submitted content of the first post, and the user-submitted content comprises social media message content related to a stage of a sales process, the stage of the sales process identified by the at least one first attribute and the at least one second attribute.

10. The method of claim 8, further comprising:
causing a recommendation of a third update to combine with the combined update to be displayed.

11. The method of claim 8, wherein the at least one first attribute and the at least one second attribute identify a first type of customer relationship management (CRM) record.

12. The method of claim 11, wherein the displayed update identifies the first type of CRM record.

13. The method of claim 8, wherein the first request is based on user input related to a first enterprise record.

14. A non-transitory computer-readable medium storing program code to be executed by at least one processor, the program code comprising instructions configured to cause:
obtaining a first request to share a comment on a first update in a feed of a social networking system associated with a database system;
obtaining a second request to share a second update in a feed of the social networking system, the second update being independent of the first update and independent of the comment;
determining, using one or more data objects stored in a database, or processing a notification, using the one or more data objects, that the second update is related to the first update based at least in part on at least one first attribute of the first update conforming to at least one second attribute of the second update;
defining, based on the second update being related to the first update, a combined update comprising at least: the first update, the comment, and the second update; and
displaying the combined update on a user device, the displayed update comprising a graphical indication that the first update, the comment, and the second update have been combined.

15. The non-transitory computer-readable medium of claim 14, wherein the first attribute is related to user-submitted content of the first post, and the user-submitted content comprises social media message content related to a stage of a sales process, the stage of the sales process identified by the at least one first attribute and the at least one second attribute.

16. The non-transitory computer-readable medium of claim 14, the instructions further configured to cause:
displaying a recommendation of a third update to combine with the combined update.

17. The non-transitory computer-readable medium of claim 14, wherein the at least one first attribute and the at least one second attribute identify a first type of customer relationship management (CRM) record.

18. The non-transitory computer-readable medium of claim 17, wherein the displayed update identifies the first type of CRM record.

19. The non-transitory computer-readable medium of claim 14, wherein the first request is based on user input related to a first enterprise record.

20. The non-transitory computer-readable medium of claim 19, wherein the comment identifies the first enterprise record.

\* \* \* \* \*